United States Patent
Kuo

(10) Patent No.: US 9,039,299 B2
(45) Date of Patent: May 26, 2015

(54) OPTICAL-ELECTRIC CONVERTING MODULE

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 87 days.

(21) Appl. No.: 13/910,128

(22) Filed: Jun. 5, 2013

(65) Prior Publication Data
US 2014/0178016 A1 Jun. 26, 2014

(30) Foreign Application Priority Data
Dec. 26, 2012 (TW) .............................. 101150289 A

(51) Int. Cl.
*G02B 6/36* (2006.01)
*G02B 6/42* (2006.01)

(52) U.S. Cl.
CPC .............. *G02B 6/423* (2013.01); *G02B 6/4249* (2013.01); *G02B 6/4253* (2013.01); *G02B 6/4256* (2013.01); *G02B 6/4201* (2013.01); *G02B 6/4214* (2013.01); *G02B 6/42* (2013.01); *G02B 6/428* (2013.01); *G02B 6/4244* (2013.01); *G02B 6/4284* (2013.01)

(58) Field of Classification Search
CPC .. G02B 6/4201; G02B 6/4214; G02B 6/4249; G02B 6/423; G02B 6/4253; G02B 6/4256
USPC ......................................... 385/14–15, 88–89
See application file for complete search history.

(56) References Cited

U.S. PATENT DOCUMENTS

| | | | |
|---|---|---|---|
| 6,611,635 B1* | 8/2003 | Yoshimura et al. ............. | 385/14 |
| 7,066,657 B2* | 6/2006 | Murali et al. ................... | 385/92 |
| 7,198,416 B2* | 4/2007 | Ray et al. ........................ | 385/93 |
| 7,298,941 B2* | 11/2007 | Palen et al. ..................... | 385/33 |
| 7,399,125 B1* | 7/2008 | Whaley et al. .................. | 385/92 |
| 7,441,965 B2* | 10/2008 | Furuno et al. .................. | 385/93 |
| 2004/0202477 A1* | 10/2004 | Nagasaka et al. ............. | 398/138 |
| 2006/0159405 A1* | 7/2006 | Yajima ............................ | 385/88 |
| 2008/0166136 A1* | 7/2008 | Birincioglu et al. .......... | 398/212 |
| 2008/0232737 A1* | 9/2008 | Ishigami et al. ................ | 385/14 |

(Continued)

FOREIGN PATENT DOCUMENTS

KR 10-2006-0054914 A * 5/2006

*Primary Examiner* — Ryan Lepisto
*Assistant Examiner* — Guy Anderson
(74) *Attorney, Agent, or Firm* — Novak Druce Connolly Bove + Quigg LLP

(57) ABSTRACT

An optical-electric converting module includes a printed circuit board (PCB) and an optical-electric coupling element. The PCB includes a supporting surface, laser diodes and photo diodes. The laser diodes and the photo diodes are positioned on the supporting surface. The optical-electric coupling element includes a lower surface.
The lower surface defines a cavity. A bottom portion of the first cavity forms light-receiving coupling lenses and light-emitting coupling lenses. The optical-electric coupling element is positioned on the supporting surface, with each light-receiving coupling lens being aligned with a laser diode, and each light-emitting coupling lens being aligned with a photo diode. A distance between the light-receiving coupling lenses and the laser diodes is equal to a distance between the light-emitting coupling lenses and the photo diodes in a direction perpendicular to the support surface.

10 Claims, 4 Drawing Sheets

(56) References Cited

U.S. PATENT DOCUMENTS

| | | | |
|---|---|---|---|
| 2009/0028575 A1* | 1/2009 | Epitaux et al. | 398/139 |
| 2011/0206379 A1* | 8/2011 | Budd et al. | 398/116 |
| 2012/0007005 A1* | 1/2012 | Schunk et al. | 250/551 |
| 2012/0027345 A1* | 2/2012 | Castagna et al. | 385/33 |
| 2012/0057822 A1* | 3/2012 | Wu et al. | 385/49 |
| 2013/0156442 A1* | 6/2013 | Mu | 398/135 |
| 2013/0230278 A1* | 9/2013 | Hung et al. | 385/14 |
| 2013/0251376 A1* | 9/2013 | Su et al. | 398/130 |
| 2013/0343698 A1* | 12/2013 | Jamyuen | 385/14 |
| 2014/0169746 A1* | 6/2014 | Hung | 385/89 |

* cited by examiner

OPTICAL-ELECTRIC CONVERTING MODULE

BACKGROUND

1. Technical Field

The present disclosure relates to an optical-electric converting module.

2. Description of Related Art

An optical-electric converting module usually includes a circuit board, a number of light emitters, a number of light receivers, and an optical-electric coupling member. The light emitters and the light receivers are mounted on and electrically connected to the circuit board. The optical-electric coupling member includes a number of coupling lenses, such as two light-receiving coupling lenses and two light-emitting coupling lenses. Each of the light-receiving coupling lenses aligns with a light emitter, and each of the light-emitting coupling lenses aligns with a light receiver. However, curvature diameters of all of the light-receiving coupling lenses and the light-emitting coupling lenses must match with different sizes of the light emitters and the light receivers. In other words, when changing a different size of the light-receiving coupling lenses or the light-emitting coupling lenses, the curvature diameter of the light-receiving coupling lenses or the light-emitting coupling lenses must be redesigned. This is timely and costly.

Therefore, it is desirable to provide an optical-electric converting module which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
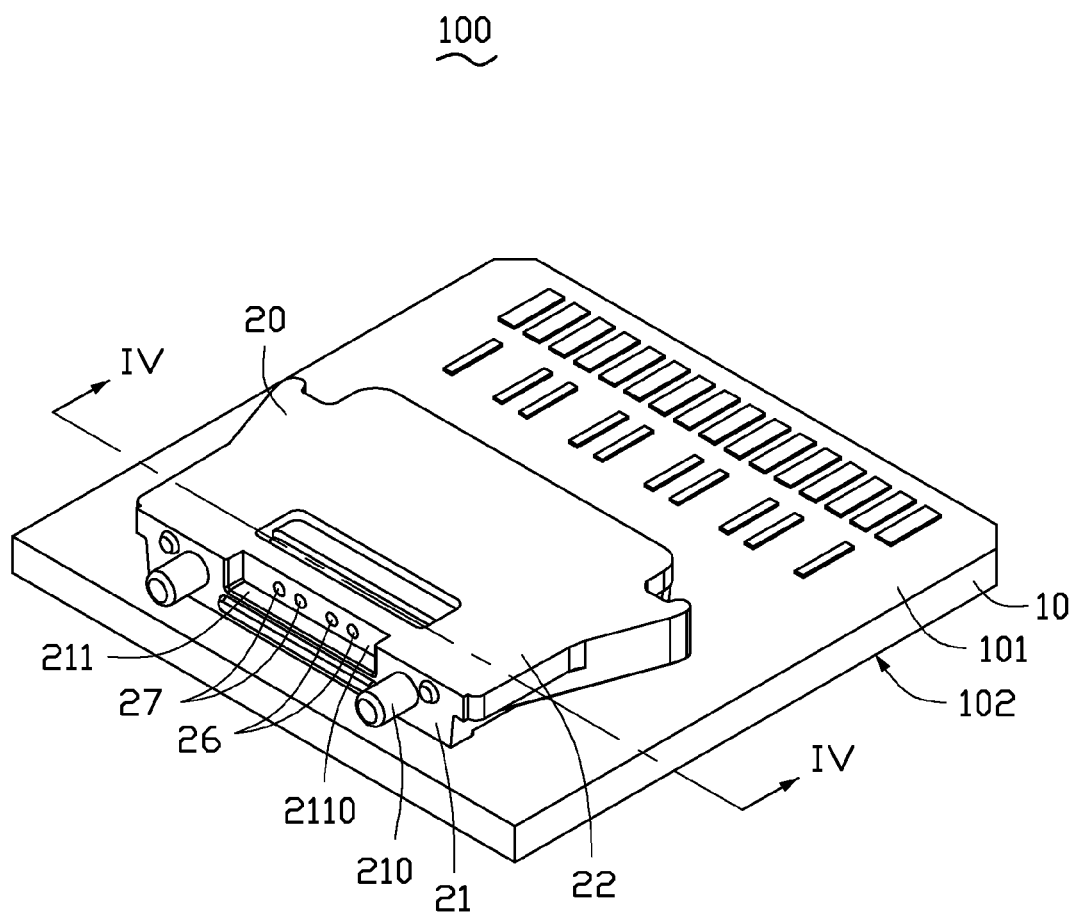
FIG. 1 is an assembled, isometric view of an optical-electric converting module, according to an exemplary embodiment.
Figure 2:
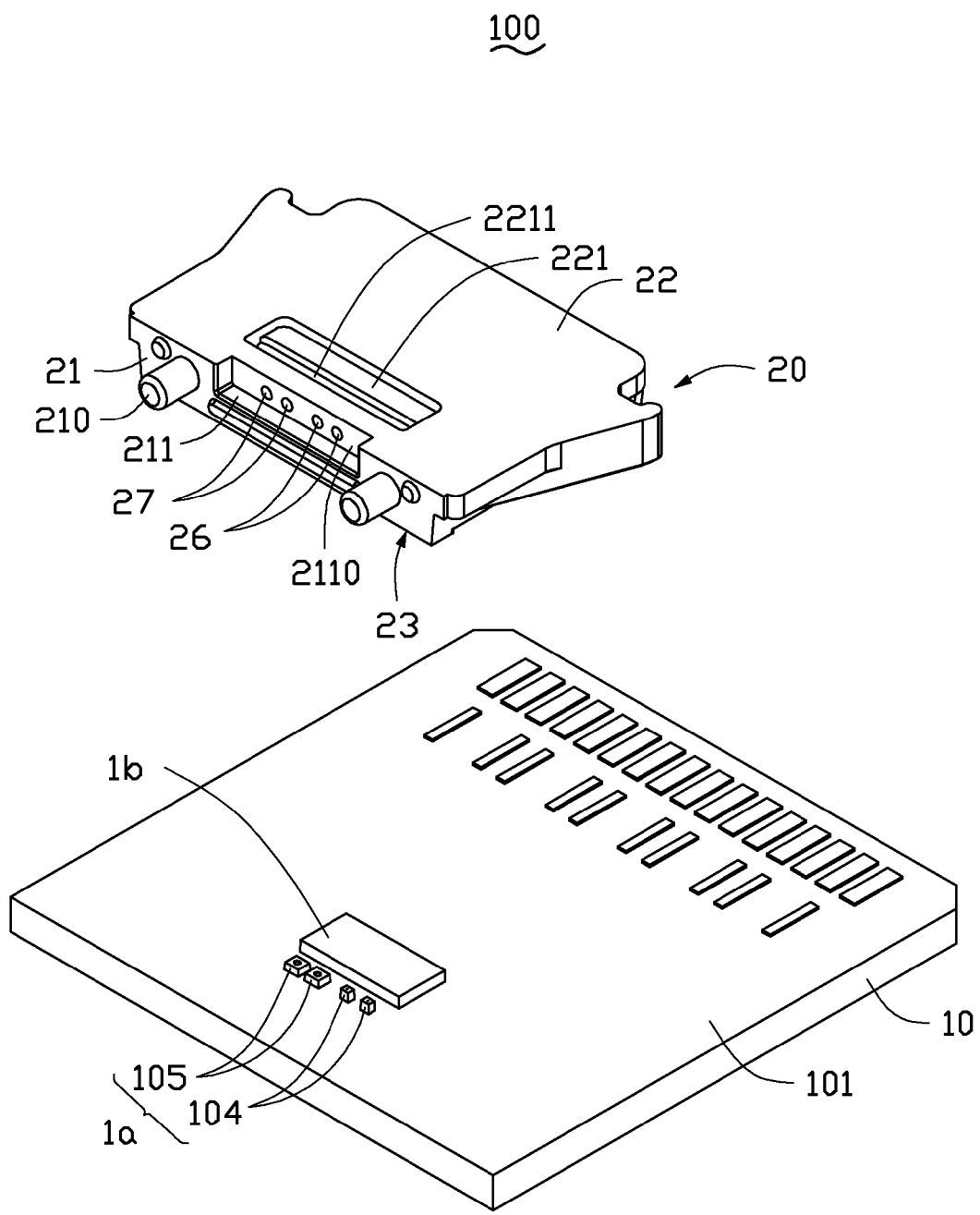
FIG. 2 is an exploded, isometric view of the optical-electric converting module of FIG. 1.
Figure 3:
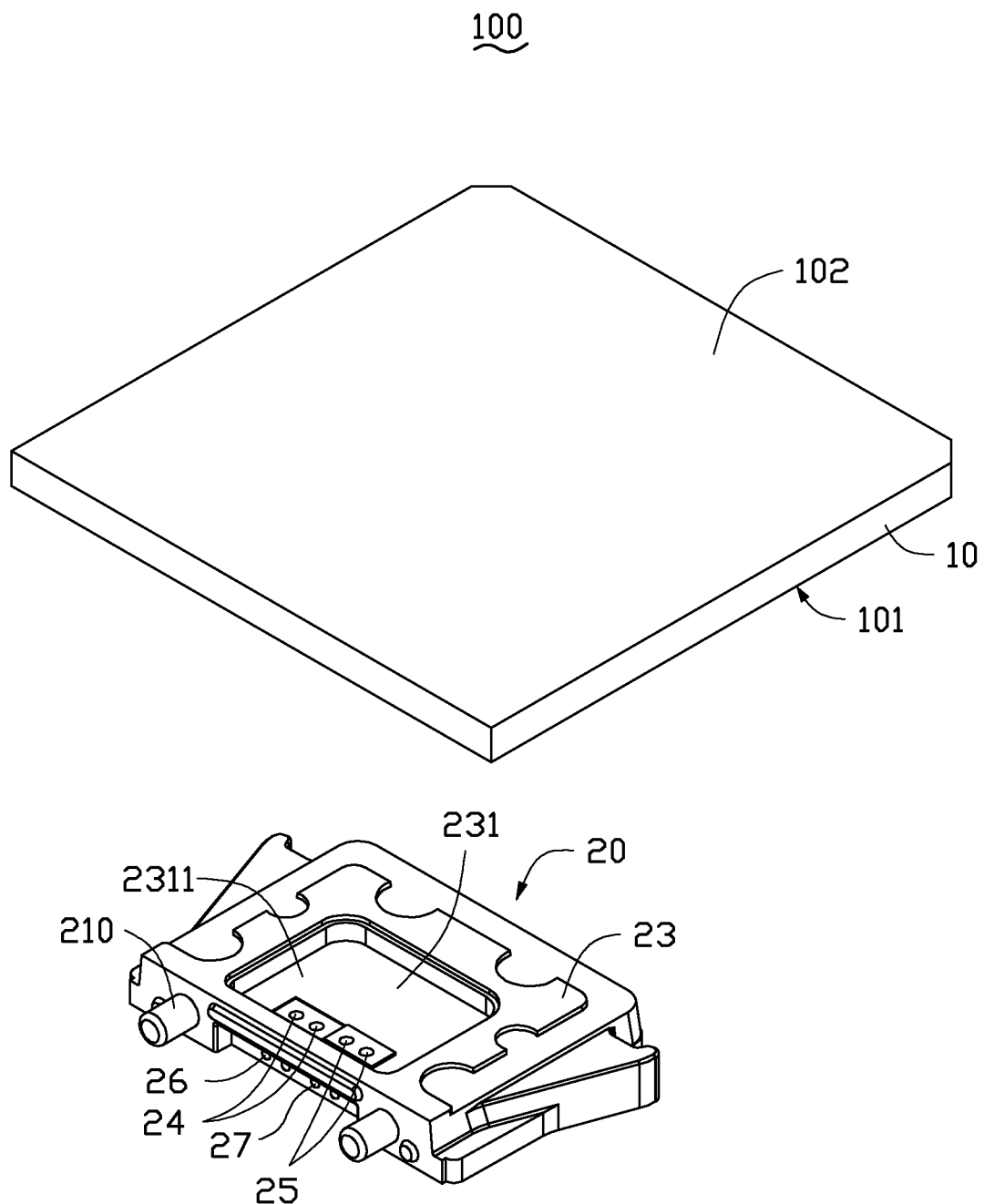
FIG. 3 is similar to FIG. 2, but viewed from another angle.
Figure 4:
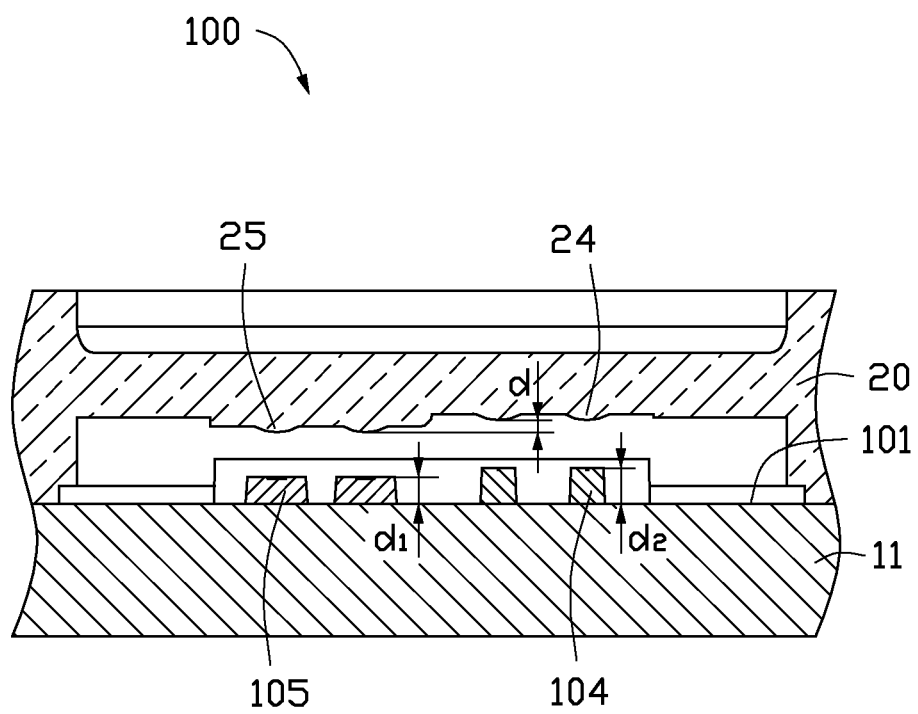
FIG. 4 is a cross-sectional view taken along line IV-IV of FIG. 1.

FIGS. 1-4 show an optical-electric converting module 100 according to an embodiment. The optical-electric converting module 100 includes a printed circuit board (PCB) 10 and an optical-electric coupling element 20 positioned on the PCB 10.

The PCB 10 includes a supporting surface 101 and a rear surface 102 facing away from the supporting surface 101. Four photoelectric conversion chips 1a, being two laser diodes 104 and two photo diodes 105 for example, are positioned on the supporting surface 101. The PCB 10 contains various circuits (not shown) that connect with the two laser diodes 104 and the two photo diodes 105. The PCB 10 also includes a drive chip 1b configured to drive the laser diodes 104 to emit light, and are configured to demodulate the data in the light received by the photo diodes 105. A height of each of the laser diodes 104 is equal to d1 along a direction perpendicular to the supporting surface 101. A height of each of the photo diodes 105 is equal to d2 along the direction perpendicular to the supporting surface 101. In the embodiment d2 is greater than d1.

The optical-electric coupling element 20 includes a first side surface 21, an upper surface 22 and a lower surface 23 facing away from the upper surface 22. The upper surface 22 is substantially parallel with the lower surface 21. The first side surface 21 perpendicularly connects the upper surface 22 and the lower surface 23.

The optical-electric coupling element 20 defines a first cavity 231 in the lower surface 23. Two first light-receiving coupling lenses 24 and two first light-emitting coupling lenses 25 are formed on a bottom portion 2311 of the first cavity 231. In the embodiment, all of the first light-receiving coupling lenses 24 and the first light-emitting coupling lenses 25 are convex lenses and are integrally formed with the optical-electric coupling element 20. The optical-electric coupling element 20 is positioned on the supporting surface 101, with the two laser diodes 104, the two photo diodes 105 and the drive chip 1b being received in the first cavity 231, such that each of the first light-receiving coupling lens 24 is aligned with a laser diode 104, and each of the first light-emitting coupling lens 25 is aligned with a photo diode 105.

The optical-electric coupling element 20 also defines a second cavity 221 in the upper surface 22. The second cavity 221 includes a sloped surface 2211 directly connected to the upper surface 22. An included angle between the upper surface 22 and the sloped surface 2211 is about 45 degrees. An included angle between an optical axis of each first light-receiving coupling lens 24 and the sloped surface 2211 is therefore about 45 degrees. An included angle between an optical axis of each first light-emitting coupling lens 25 and the sloped surface 2211 is also about 45 degrees.

The optical-electric coupling element 20 also defines a receiving cavity 211 in the first side surface 21. The receiving cavity 211 includes a vertical surface 2110 substantially perpendicular to the upper surface 22. The vertical surface 2110 forms two second light-emitting coupling lenses 26 and two second light-receiving coupling lenses 27. In the embodiment, all of the second light-receiving coupling lenses 27 and the second light-emitting coupling lenses 26 are convex lenses and are integrally formed with the optical-electric coupling element 20. Each of the second light-receiving coupling lenses 27 corresponds to a first light-emitting coupling lens 25. Each of the second light-emitting coupling lenses 26 corresponds to a first light-receiving first lens 24. An included angle between an optical axis of each second light-emitting coupling lens 26 and the sloped surface 2211 is also about 45 degrees. An included angle between an optical axis of each second light-receiving coupling lens 27 and the sloped surface 2211 is therefore about 45 degrees.

A height difference between the first light-emitting coupling lens 25 and the first light-receiving coupling lenses 24 is equal to d, along a direction perpendicular to the supporting surface 101. In the embodiment, d2−d1=d. As such, a distance between the first light-receiving coupling lenses 24 and the laser diode 104 is equal to a distance between the first light-emitting coupling lens 25 and the photo diode 105.

Two locating poles 210 perpendicularly extend from the first side surface 21. In the embodiment, the locating poles 210 are symmetrical about the receiving cavity 211.

In use, light emitted from the two laser diodes 104 is directed into the optical-electric coupling element 20 by the two first light-receiving coupling lenses 24, and the light path is bent about 90 degrees by the sloped surface 2211. In the embodiment, the second light-emitting coupling lenses 26 are positioned on the light path from the sloped surface 2211. The light is thus finally reflected into two optical fibers (not shown) by the second light-emitting coupling lenses 26. A process of the photo diodes 105 receiving light is the reverse of that of the laser diodes 104 emitting light.

In other embodiments, the numbers of the laser diodes 104, the photo diodes 105, the first light-receiving coupling lenses 24, the first light-emitting coupling lenses 25, the second light-emitting coupling lenses 26 and the second light-receiving coupling lenses 27 can be changed depending on need.

In other embodiments, the receiving cavity 211 can be omitted from optical-electric coupling element 20, and the second light-receiving coupling lens 26 and the second light-emitting coupling lens 27 be formed directly on the first side surface 21.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical-electric converting module, comprising:
    a printed circuit board (PCB) comprising a supporting surface, at least one laser diode and at least one photo diode, the at least one laser diode and the at least one photo diode positioned on the supporting surface and electrically connected to the PCB; and
    an optical-electric coupling element comprising:
        a lower surface defining a first cavity, a bottom portion of the first cavity forming at least one first light-receiving coupling lens and at least one first light-emitting coupling lens, the optical-electric coupling element positioned on the supporting surface, with each of the at least one the first light-receiving coupling lens being aligned with a respective one of the at least one laser diode, and each of the at least one first light-emitting coupling lens being aligned with a respective one of the at least one photo diode, a distance between the at least one first light-receiving coupling lenses and the at least one laser diode being equal to a distance between the at least one first light-emitting coupling lens and the at least one photo diode in a direction perpendicular to the supporting surface;
    wherein a height of each of the at least one laser diode is equal to d1 along a direction perpendicular to the supporting surface, a height of each of the at least one photo diode is equal to d2 along the direction perpendicular to the supporting surface, d2>d1.

2. The optical-electric converting module of claim 1, wherein the optical-electric coupling element comprises a side surface perpendicularly connecting to the lower surface, the side surface forming at least one second light-receiving coupling lens and at least one second light-emitting coupling lens.

3. The optical-electric converting module of claim 2, wherein the optical-electric coupling element comprises an upper surface substantially parallel with the lower surface, the upper surface defines a second cavity, and the second cavity comprises a sloped surface directly connected to the upper surface.

4. The optical-electric converting module of claim 3, wherein an included angle between the upper surface and the sloped surface is about 45 degrees, an included angle between an optical axis of each first light-receiving coupling lens and the sloped surface is about 45 degrees, an included angle between an optical axis of each first light-emitting coupling lens and the sloped surface is also about 45 degrees, an included angle between an optical axis of each second light-receiving coupling lens and the sloped surface is about 45 degrees, and an included angle between an optical axis of each second light-emitting coupling lens and the sloped surface is also about 45 degrees.

5. The optical-electric converting module of claim 2, wherein the side surface defines a receiving cavity, the receiving cavity comprises a vertical surface substantially perpendicular to the upper surface, and the at least one second light-emitting coupling lenses and the at least one second light-receiving coupling lens are formed on the vertical surface.

6. The optical-electric converting module of claim 5, wherein the optical-electric coupling element comprises two locating poles perpendicularly extending from the first surface, and the locating poles are symmetrical about the receiving cavity.

7. The optical-electric converting module of claim 2, wherein the at least one second light-receiving coupling lens and the at least one second light-emitting coupling lens are convex lenses and are integrally formed with the optical-electric coupling element.

8. The optical-electric converting module of claim 1, wherein the at least one first light-receiving coupling lens and the at least one first light-emitting coupling lenses are convex lenses and are integrally formed with the optical-electric coupling element.

9. The optical-electric converting module of claim 1, wherein the PCB comprises a driver chip, the drive chip is received in the first cavity, the drive chip is configured to drive the at least one laser diode to emit light and configured for the demodulation of data in the light received by the at least one photo diode.

10. The optical-electric converting module of claim 1, wherein a height difference between the at least one first light-emitting coupling lens and the at least one first light-receiving coupling lenses is equal to d, along a direction perpendicular to the supporting surface, d2−d1=d.

* * * * *